United States Patent [19]

Allen et al.

[11] Patent Number: 5,448,805
[45] Date of Patent: Sep. 12, 1995

[54] VEHICLE RACK STRAP COMBINED SLEEVE HOOK

[75] Inventors: Scott R. Allen; Douglas P. Gibbs, both of Yuba City; Donn S. Van Dusen, Loma Rica, all of Calif.

[73] Assignee: Mascotech Accessories, Inc., Sacramento, Calif.

[21] Appl. No.: 144,120

[22] Filed: Oct. 27, 1993

[51] Int. Cl.⁶ .............. A44B 13/00; B60P 7/00
[52] U.S. Cl. .................. 24/300; 24/68 CD; 24/482; 410/105
[58] Field of Search ........... 24/300, 482, 481, 68 CD; 410/105, 96, 110, 100

[56] References Cited

U.S. PATENT DOCUMENTS

| 487,041 | 11/1892 | Ziegler | 24/300 |
|---|---|---|---|
| 1,401,099 | 12/1921 | Anderson | 24/600.9 |
| 2,889,165 | 6/1959 | Zientara | 24/300 |
| 3,043,550 | 7/1962 | Garbarino et al. | 410/110 |
| 3,174,787 | 3/1965 | Kolman | 24/300 |
| 3,698,678 | 10/1972 | Bowers | 410/105 |
| 4,754,531 | 7/1988 | Skyba | 24/300 |
| 5,003,672 | 4/1991 | Randall | 24/300 |
| 5,063,641 | 11/1991 | Chuan | 24/68 CD |
| 5,144,724 | 9/1992 | Chuan | 24/68 CD |
| 5,306,156 | 4/1994 | Gibbs et al. | 439/34 |

FOREIGN PATENT DOCUMENTS 0609783  11/1960  Canada ................ 24/300

*Primary Examiner*—Victor N. Sakran
*Attorney, Agent, or Firm*—Flehr, Hohbach, Test, Albritton & Herbert

[57] ABSTRACT

A rack strap for an automotive vehicle rack is described having a hook securing arrangement made up not only of a hook but also a sleeve. The sleeve cooperates with the hook to protect the load at the location of the hook, as well as to hinder disengagement of the hook relative to the rack bar. In one embodiment, the hook includes a reentrant end which passes through an eyelet at a rack cross bar, which reentrant end can be encompassed by the sleeve. In another embodiment, the sleeve acts to maintain clasp pieces about a rack cross bar.

24 Claims, 2 Drawing Sheets

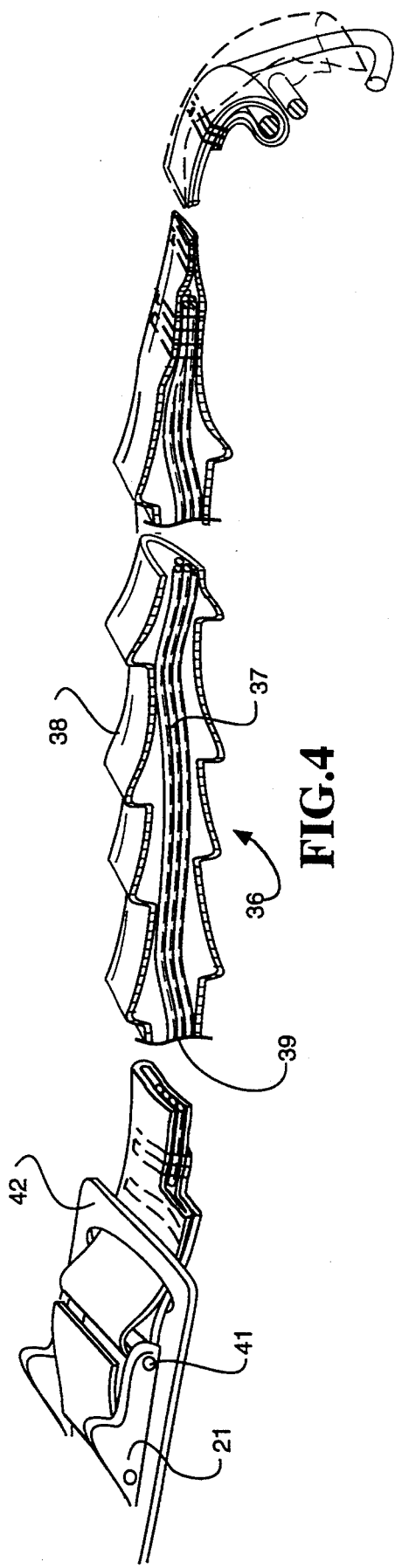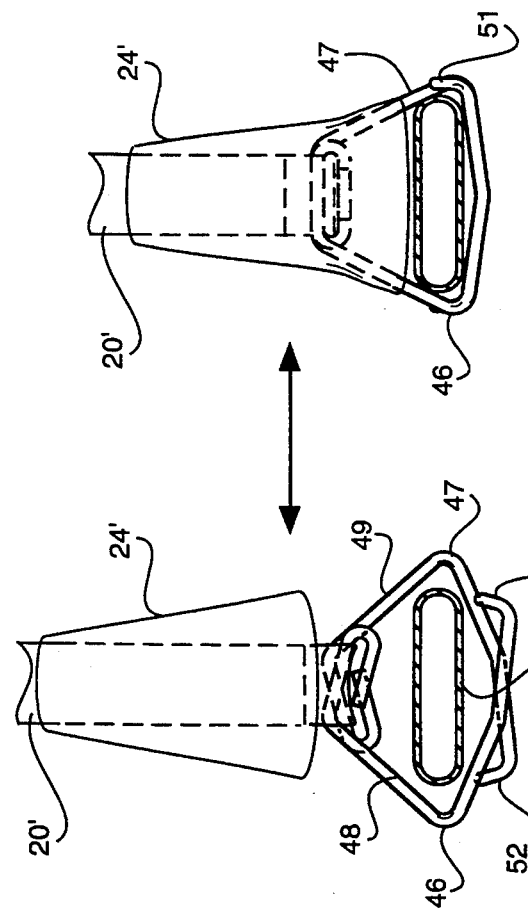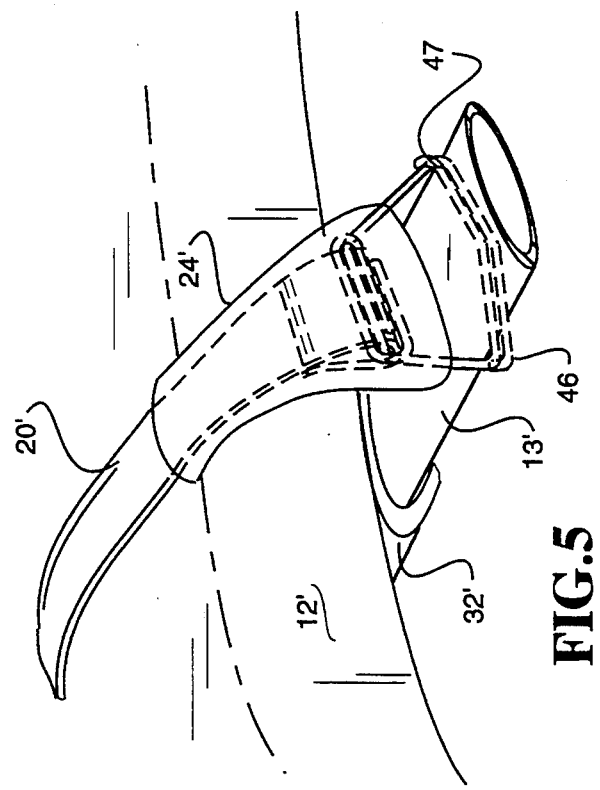

VEHICLE RACK STRAP COMBINED SLEEVE HOOK

BACKGROUND OF THE INVENTION

This invention relates to automotive vehicle racks and, more particularly, to a flexible rack strap.

Automotive vehicle racks are used to transport sporting equipment, such as surfboards, canoes and kayaks, to a location at which such equipment is to be used. Flexible rack straps are typically used to secure such equipment to the rack.

Most rack straps now available are secured to the rack by knotting. It will be appreciated that tying down a load with knotting is time-consuming. Moreover, the quality of the tie-down and the various knotting that is used is quite variable. While some rack straps have been provided with hooks at their ends for engagement with a rack bar (a longitudinal side rail, a cross bar or a slat at the vehicle surface), rack straps of this nature have not supplanted use of the typical knotting type strips. One reason for this is a fear that hook arrangements provided in the past will mar the surface or even "crush" the load. Another reason is that many hook arrangements provided in the past have been perceived as unreliable.

SUMMARY OF THE INVENTION

The present invention is a rack strap which addresses the above problems. In its basic aspects, the rack strap of the invention includes a flexible strapping, as is common, having a free end. A hook is secured to the free end, and a sleeve is provided on such free end cooperating with the hook to encompass a portion of the latter. Most desirably, the sleeve is slidable between two positions, a first one exposing the hook portion and a second position encompassing the same. The second position preferably is one in which the sleeve inhibits disengagement of the hook from a rack bar. This inhibits the hook with which it is associated from vibrating loose during transportation. Moreover, the sleeve is configured to conform generally to the counterpart shape of a surface of a load expected to be held thereby. It is made of an elastomeric material and is sufficiently soft, as will be described, to conform to the curvature of the expected load. It is selected to assure that the frictional relationship of its exterior surface to the counterpart surface of an expected load will maintain the sleeve in position.

The rack strap of the invention also preferably includes an elastic section which cooperates with the end hook(s) to maintain the hook(s) taut in spite of the typical vibration expected during transportation, thereby aiding in maintaining the hook in engagement with a rack. Other features and advantages of the invention either will become apparent or will be described in connection with the following, more detailed description of a preferred embodiment of the invention.

BRIEF DESCRIPTION OF THE DRAWINGS

With reference to the accompanying drawing:

FIG. 4 is a broken-away view of a portion of the embodiment of the rack strap shown in FIG. 1;

FIG. 5 is an isometric view similar to that of FIG. 2 illustrating an alternate embodiment of the instant invention; and FIGS. 6 and 7 are sectional views similar to FIG. 3 illustrating differing positions of the sleeve.

DETAILED DESCRIPTION OF THE PREFERRED EMBODIMENTS

The following relatively detailed description is provided to satisfy the patent statutes. However, it will be appreciated by those skilled in the art that various changes and modifications can be made without departing from the invention.

Figure 1:
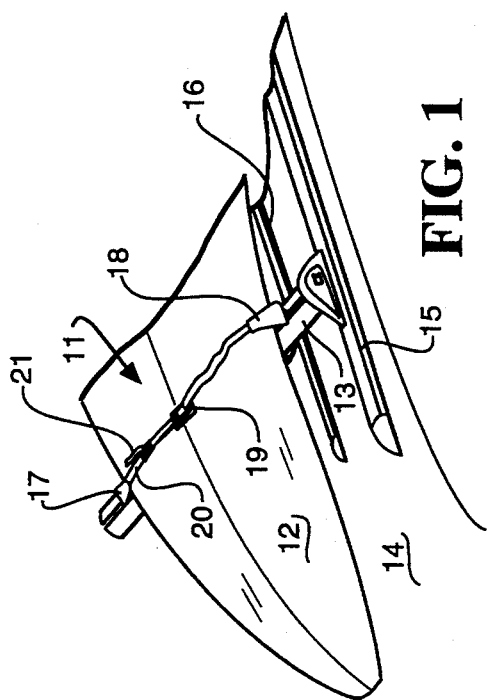
FIG. 1 is an isometric view illustrating a preferred embodiment of a rack strap of the invention securing a kayak end to a rack on a vehicle roof.

A preferred embodiment of the rack strap of the invention is illustrated in FIG. 1, securing a load to a vehicle rack. Such rack strap, generally referred to by the reference numeral 11, is illustrated securing one end 12 of a kayak to a cross bar 13 of a roof rack on a roof panel 14 of a vehicle. The roof rack also includes side rails 15 and longitudinal slats 16, one of which is shown. (Such side rails and slats broadly are, along with cross bar 13, rack bars.)

Rack strap 11 includes flexible strapping having at each of its ends, a pair of hook securing arrangements 17 and 18 (to be described in more detail hereinafter) for securance to the bar, and a take-up or "cinch" buckle 19. Rack strap 11 also includes on one side of the buckle, a standard flexible nylon webbing 20 with an end thereof in a common webbing end coupling 21.

Figure 2:
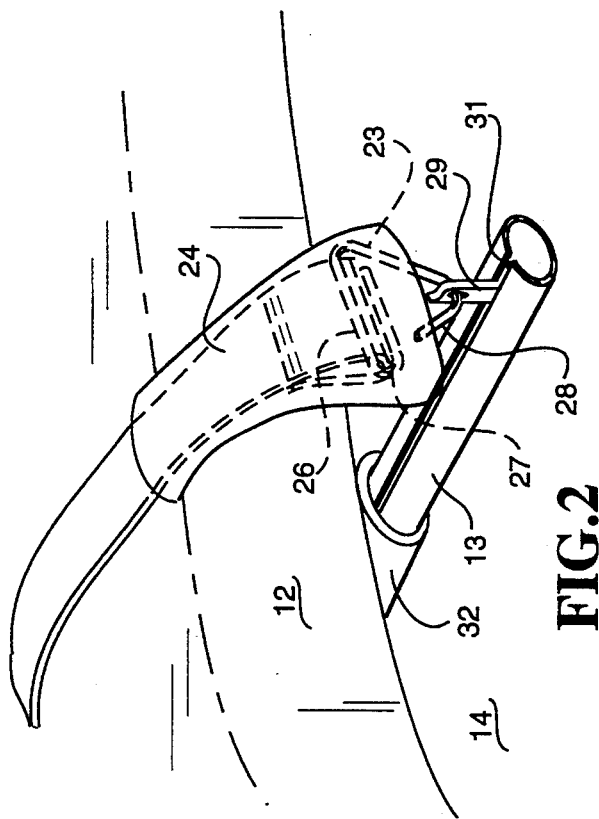
FIG. 2 is an enlarged isometric view illustrating a preferred embodiment of the combination of the invention at the end of a rack strap.

In keeping with the invention, hook securing arrangements 17 and 18 at the respective ends of the flexible strapping includes both a hook 23 and a flexible sleeve 24. FIG. 2 illustrates securing arrangement 17, and it will be seen that a hook is secured to the webbing 20 by the webbing end passing about a securance bar 26 of the hook and being doubled back to be sewn to itself. The end of the hook at bar 26 is also doubled back upon itself as illustrated to define, in essence, a slot 27 for the webbing and inhibit unintended separation between the webbing and the hook.

The hook 23 includes a reentrant end 28 which passes through an eyelet tie-down element 29 slidably received within a slot 31 in cross bar 13. Padding 32 or other protection is provided to prevent the cross bar 13 itself from marring or otherwise damaging the load.

As a major feature of the instant invention, when the sleeve is in the position illustrated in FIG. 2, it encompasses that portion of the hook which a user might otherwise be concerned may come into contact with a loaded article and damage the same. This enables the material of the hook to be a metal or metal alloy to assure integrity of connection. Most desirably, the sleeve 24 is configured as illustrated in FIG. 2, to conform generally to the counterpart shape of the type of load expected to be carried. If the load is expected to be a surf or sailboard, a kayak or a canoe, the configuration illustrated in FIG. 2 is quite satisfactory.

Sleeve 24 is made compliant of an elastomeric material, e.g., of rubber or a synthetic rubber. Most desirably, the sleeve has a hardness in the range of between about 50 and 80 durometers, Shore A. A quite suitable material is the "Vinyl Plastisol" material available from Aydin Molded Devices of Los Angeles, Calif. Aydin also has a product it sells as a "Guard-Sleeve" having a hardness of 75 durometers, Shore A that is quite suitable for the sleeve. This product has a high friction exterior surface and its use assures that for most loads the frictional relationship of the sleeve exterior surface to the counterpart surface of the load will assure that such sleeve is maintained in position by the load.

As mentioned previously, the sleeve is slidably received on the strapping. As a major feature of the instant invention, it is slidable between a position shown in solid in FIG. 3 exposing the hook and a position shown in the phantom encompassing a portion of the hook. Most desirably, the second position of the sleeve, i.e., the position encompassing the hook, is one in which the sleeve encompasses the reentrant end of the hook. Thus, the second position is a position inhibiting disengagement of the hook from the eyelet 29 and, hence, from the rack bar. This significantly adds to the reliability of the connection. In this connection, the functional relationship of the exterior of the sleeve 24 to the counterpart surface of the load maintains the sleeve on the hook reentrant end. Thus, the sleeve cooperates with the hook to enhance the securance reliability.

The rack strap 11 includes an elastic section 36. In the arrangement being described, the elastic section 36 is on the side of the buckle 19 opposite webbing 20, and it extends between the rack hook securing arrangement 18 and the buckle. Elastic section 36 has two components, an elastic flexible cord represented in FIG. 4 at 37 and an outer inelastic but flexible fabric tubing or sleeve 38. As illustrated sleeve 38 is longer than the length to which it is expected the elastomer cord 37 may be stretched, and the opposite ends of the cord are secured via sewing to the tubing. The result is that the inelasticity of the sleeve 38 does not interfere with desired stretching of the cord. It should be recognized from the broad standpoint, though, that the sleeve need not be longer than the fully extended cord—the sleeve itself can be used to set the limits of allowed stretching of the cord. Moreover, from the broad standpoint the sleeve itself could be elastic, such as by being woven from elastic material.

Elastic cord 37 is made up of a plurality of synthetic rubber strands 39. In one implementation of the instant invention, each of the strands 39 was a 300 mm long and 4 mm diameter elongated strand of the stretch (fibertex) cord referred to as a Bungee ™ cord. An advantage of having a plurality of strands is that although the overall thickness provided by a multiple number of strands is basically the same as a single strand providing the same elastic properties, the sectional configuration is quite malleable by changing the spatial relationships of the multiple strands at the section. Moreover, a plurality provides added safety in the event of a single strand failure. The strands provided the cord with a total elasticity of about 35 lb-force, although the elasticity could be any place in the range of between 15 lb-force and 70 lb-force depending on applications.

As mentioned previously, the section 36 extends between rack hook securing arrangement 18 and buckle 19.

As shown in FIG. 4, at the hook securing end, tubing 38 extends through the slot of the hook and is sewn doubled back upon itself. The cord 37 is secured directly to the sleeve by the strands 39 being made generally planar and the sewing of nylon thread through the same. The other end of the sleeve passes about an end bar 41 of the buckle and is sewn upon itself. A protective shield 42 is provided to separate the metal of the buckle from the surface of the load. It should be noted that the strand ends are also captured at such location by the sewing.

Elastic section 36 cooperates with the hook securing arrangements 17 and 18. For one thing, the elastic section assures that the hooks remain in engagement with the rack bar eyelets during movement—it keeps such engagement taut. Furthermore, because of the elastic section load cinching can be done with a recognition that any slight load shifting that is caused later will be "taken-up" by the strap. The tubing will protect the load from the surface changes in the elastic strands caused by tensile forces. Vibrations and/or load shifting during the transportation will be accommodated, and if the elastomeric cord should break, the tubing will provide the reliable securance at the elastic section which is needed to match the reliability provided by the hooks.

Figure 3:
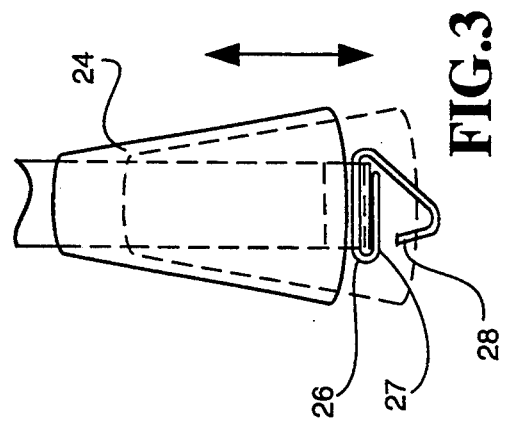
FIG. 3 is an elevation view of the strap end illustrating movement of a sleeve element of the invention between two positions as will be described.

The nature of the hook that is part of each hook securing arrangement of the invention is not limited to that illustrated in FIGS. 2, 3 and 4. In fact, use of the sleeve enables use of hook structures which otherwise may not be considered very reliable. FIGS. 5 through 7 depict a preferred embodiment of the invention utilizable with rack cross bars which do not include a slot or the like providing an eyelet. Parts which are the same or similar to like parts in the earlier embodiment are referred to by the same reference numerals, primed.

Each hook is made up of two clasp pieces or components 46 and 47. These components are identical to one another but are opposed so as to grasp the cross bar 13' therebetween. In this connection, as can be seen, each component includes a main depending downwardly projecting bar 48 and 49, respectively, to be located on one side of the bar 13' and respective upturned ends 51 and 52 making the hook reentrant for the opposite side of such bar. When the sleeve 24' is in the position shown in FIG. 6, the clasps are manipulatable to surround the bar. The sleeve 24' is then movable to the position shown in FIG. 7 in which it maintains the clasp pieces in position grasping the rack bar. In this connection, as mentioned previously the sleeve 24' is compliant and is distortable somewhat. The actual movement of the sleeve between its two positions moves the clasp pieces toward one another to provide the desired grasping. As illustrated, the interior surface of the sleeve engages the clasp pieces. The relative friction between the interior surface and the counterpart surfaces of the clasp pieces which are engaged is selected to maintain the sleeve in such position. In this connection, the counterpart surface of the clasp pieces and that portion of each which engages the bar 13' are made by providing the same with a covering.

The clasp pieces 48 and 49 preferably also are of metal but are coated with a high friction material to cooperate with the interior part of the sleeve in engagement therewith. Such material is selected also to protect the finish of the cross bar 13' from the metal of the clasp pieces. A suitable covering is provided by dipping each of the clasp pieces in vinyl.

It will be seen in this embodiment that the clasp automatically adjusts to the width of a cross bar with which the hook is to be used. Moreover, a securance is provided with a hook arrangement which otherwise might not be considered secure. It should be noted that it is preferred the strap with which this embodiment is used also include the elastic section to maintain tautness, among other things.

As mentioned at the beginning of the detailed description, applicants are not limited to the specific embodiment described above. Various changes and modifications can be made. For example, although the preferred embodiment is a strap especially designed for use with an automotive vehicle rack, from the very broad standpoint the features of the instant invention can be incorporated in straps designed for other uses. The claims, their equivalents and their equivalent language define the scope of protection.

What is claimed is:

1. In a rack strap for use in strapping a load to a vehicular rack, the combination comprising:
    (a) a flexible strapping having a free end, said strapping including an elastic section made up of a flexible elastomer cord and a flexible fabric sleeve surrounding a portion of the same, said cord being fixed to the sleeve adjacent the ends of the former;
    (b) a hook secured to said strapping free end for engagement with a rack bar; and
    (c) a slidable sleeve received on said free end of said flexible strapping encompassing a portion of said hook, said elastic section cooperating with said hook during vehicle movement to aid in maintaining said hook in engagement with said vehicular rack bar.

2. The rack strap of claim 1 wherein said sleeve is slidably received on said free end of said strap, for sliding between two positions, a first position exposing a position of said hook portion and a second position encompassing said.

3. The rack strap of claim 2 wherein said sleeve is configured to conform generally to the counterpart shape thereat of a surface of a load expected to be held thereby.

4. The rack strap of claim 3 wherein said sleeve generally is made compliant by being made of of an elastomeric material.

5. The rack strap of claim 4 wherein said elastomeric material has a hardness in the range of between about 50 and 80 durometers, Shore A.

6. The rack strap of claim 5 wherein said elastomeric material has a hardness of 75 durometers, Shore A.

7. The rack strap of claim 2 wherein the frictional relationship of the exterior surface of said sleeve to a counterpart surface of an expected load is selected to maintain said sleeve in said second position when said sleeve exterior surface is in engagement with said counterpart surface.

8. The rack strap of claim 7 wherein said rack strap includes a buckle and a protective shield provided to separate said buckle from an expected load.

9. The rack strap of claim 2 wherein said second position is a position inhibiting disengagement of said hook from said rack bar.

10. The rack strap of claim 9 wherein said hook includes a reentrant end for engagement with said rack bar, and said sleeve encompasses said hook end when said sleeve is in said second position.

11. The rack strap of claim 10 wherein said rack bar includes an eyelet, and said hook end is configured to pass therethrough prior to being covered by said sleeve.

12. The rack strap of claim 2 wherein said hook includes a pair of opposed clasp pieces configured to grasp a rack bar between the same when said pieces are together in a particular relationship; and said sleeve is configured to facilitate engagement of said clasp pieces with a vehicular rack bar when said sleeve is in said first position, and to hold said opposed clasp pieces about said rack bar when said sleeve is in said second position.

13. The rack strap of claim 1 wherein said flexible fabric tube surrounds that portion of said elastomer cord otherwise expected to contact a load to be carried during use of said rack strap.

14. The rack strap of claim 1 wherein said sleeve has a pair of positions with respect to said rack bar, in a first one of which it exposes said hook for engagement with said rack bar and in a second one of which it is retracted from said hook, and wherein said hook includes a reentrant end configured to pass through an eyelet associated with said rack bar when said sleeve is in said first position prior to being covered by said sleeve.

15. The rack strap of claim 14 wherein said second position of said sleeve inhibits disengagement of said hook reentrant end from said eyelet.

16. The rack strap of claim 17 wherein said elastic section cooperates with said hook to assure that its engagement with said eyelet during movement of said vehicle remains taut.

17. In a rack strap for use in strapping a load to a vehicular rack, the combination comprising:
    (a) a flexible strapping having a free end;
    (b) a hook secured to said strapping free end for engagement with a rack bar, which hook includes a pair of opposed clasp pieces configured to grasp a rack bar between the same when said pieces are together in a particular relationship; and
    (c) a slidable sleeve received on said free end on said flexible strapping movable between two positions, a first one in which said clasp pieces are manipulatable to surround a vehicular rack bar and a second one in which said slide maintains said pieces surrounding said rack bar grasping the same to secure said strap thereto.

18. The rack strap of claim 17 wherein movement of said sleeve between said first and second positions moves said clasp pieces toward one another to provide said grasping.

19. The rack strap of claim 17 wherein said sleeve is generally compliant and the interior surface thereof engages said clasp pieces when it is in said second position, the relative friction between said interior surface and the counterpart surfaces of the clasp pieces engaged thereby being selected to maintain said sleeve in said position.

20. The rack strap of claim 19 wherein said counterpart surfaces of said clasp pieces are provided by a covering on each of said pieces.

21. In a rack strap of claim 17 wherein said strapping also includes an elastic section made up of a flexible elastomer cord an a flexible fabric sleeve surrounding that portion of said elastomer cord otherwise expected to contact a load to be carried during use of said rack strap and fixed to the ends of said elastomer cord, said elastic section cooperating with said hook during vehicle movement to aid in maintaining said hook in engagement with said vehicular rack bar.

22. In a rack strap for use in strapping a load to a vehicular rack, the combination comprising:
    (a) a flexible strapping having a free end;
    (b) a hook secured to said strapping free end for engagement with a rack bar; and
    (c) a slidable sleeve received on said free end of said flexible strapping configured generally to conform to a shape thereat of a counterpart surface of an expected load and encompassing a portion of said hook to protect the load to be carried on said vehicular rack from said hook portion; said sleeve being slidable on said strap between two positions, a first position exposing said portion and a second position encompassing the same, the frictional relationship of the exterior surface of said sleeve being selected to maintain said sleeve in said second position when it is in engagement with said counterpart surface of an expected load.

23. The rack strap of claim 22 wherein said second position of said sleeve is selected to also inhibit disengagement of said hook from said vehicular rack bar.

24. The rack strap of claim 22 wherein said hook includes a pair of opposed clasp pieces configured to grasp a rack bar between the same when said pieces are together in a particular relationship, said first position of said sleeve being selected to permit said clasp pieces to be manipulated to surround a vehicular rack bar, said sleeve being movable to said second position to move said clasp pieces toward one another to grasp said rack bar and thereby secure said strap thereto.

* * * * *